United States Patent
Song et al.

(10) Patent No.: US 12,358,274 B2
(45) Date of Patent: Jul. 15, 2025

(54) METHOD OF MANUFACTURING CLAD STEEL SHEET HAVING EXCELLENT FORMABILITY AND FATIGUE PROPERTY

(71) Applicant: POSCO CO., LTD, Pohang-si (KR)

(72) Inventors: Tae-Jin Song, Gwangyang-si (KR); Min-Seo Koo, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/353,843

(22) Filed: Jul. 17, 2023

(65) Prior Publication Data
US 2024/0326399 A1    Oct. 3, 2024

Related U.S. Application Data

(62) Division of application No. 17/260,653, filed as application No. PCT/KR2019/008381 on Jul. 8, 2019, now Pat. No. 11,752,752.

(30) Foreign Application Priority Data

Jul. 27, 2018  (KR) ........................ 10-2018-0087721

(51) Int. Cl.
*B32B 15/04*    (2006.01)
*B23K 20/04*    (2006.01)
(Continued)

(52) U.S. Cl.
CPC ............ *B32B 38/004* (2013.01); *B23K 20/04* (2013.01); *B23K 20/227* (2013.01); *B23K 20/24* (2013.01);
(Continued)

(58) Field of Classification Search
CPC ........ B32B 2307/536; B32B 2307/552; B32B 2307/72; B32B 2250/03; B32B 2250/40;
(Continued)

(56) References Cited

U.S. PATENT DOCUMENTS 6,427,904 B1    8/2002    Groll
2003/0145911 A1    8/2003    Hoffmann et al.
(Continued)

FOREIGN PATENT DOCUMENTS

CN    105543649    5/2016
CN    106133155    11/2016
(Continued)

OTHER PUBLICATIONS

Chinese Office Action—Chinese Application No. 201980045390.5 issued on Apr. 26, 2022, citing KR 10-1758567, US 2009/0165897, US 2013/0295409, CN 107226301, and CN 106133155.
(Continued)

*Primary Examiner* — Michael E. La Villa
(74) *Attorney, Agent, or Firm* — CANTOR COLBURN LLP

(57) ABSTRACT

Provided is a method of manufacturing a clad steel sheet. The method includes: preparing a base material including C: 0.3 to 1.0%, Mn: 4.0 to 16.0%, Al: 4.5 to 9.0%, and a remainder of Fe and inevitable impurities; preparing a cladding material including C: 0.1 to 0.45%, Mn: 0.1 to 3.0%, and a remainder of Fe and inevitable impurities; disposing the base material between two of the cladding material to obtain a laminate; welding an edge of the laminate; heating the welded laminate between 1050 and 1350° C.; finish-rolling the heated laminate between 750 and 1050° C. with a rolling reduction ratio of 30% or more in a first pass; coiling the hot-rolled steel sheet between 400 and 700° C.; pickling the coiled hot-rolled steel sheet, and applying a cold-reduction ratio of 35 to 90%; and annealing the cold-rolled steel sheet between 550° C. and A3+200° C. of the cladding material.

2 Claims, 4 Drawing Sheets

(51) Int. Cl.

| | |
|---|---|
| *B23K 20/227* | (2006.01) |
| *B23K 20/24* | (2006.01) |
| *B23K 31/02* | (2006.01) |
| *B32B 15/01* | (2006.01) |
| *B32B 15/18* | (2006.01) |
| *B32B 38/00* | (2006.01) |
| *C21D 1/18* | (2006.01) |
| *C21D 8/02* | (2006.01) |
| *C21D 8/04* | (2006.01) |
| *C21D 9/46* | (2006.01) |
| *C21D 9/48* | (2006.01) |
| *C22C 38/00* | (2006.01) |
| *C22C 38/02* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/18* | (2006.01) |
| *C22C 38/22* | (2006.01) |
| *C22C 38/26* | (2006.01) |
| *C22C 38/28* | (2006.01) |
| *C22C 38/32* | (2006.01) |
| *C22C 38/34* | (2006.01) |
| *C22C 38/38* | (2006.01) |
| *C22C 38/40* | (2006.01) |
| *C22C 38/44* | (2006.01) |
| *C22C 38/48* | (2006.01) |
| *C22C 38/50* | (2006.01) |
| *C22C 38/54* | (2006.01) |
| *C23C 2/02* | (2006.01) |
| *C23C 2/06* | (2006.01) |
| *C23C 2/12* | (2006.01) |
| *C23C 2/18* | (2006.01) |
| *C23C 2/34* | (2006.01) |
| *C23C 2/40* | (2006.01) |
| *C23C 30/00* | (2006.01) |
| *B23K 101/16* | (2006.01) |
| *B23K 101/18* | (2006.01) |
| *B23K 103/04* | (2006.01) |
| *B23K 103/18* | (2006.01) |
| *C21D 1/25* | (2006.01) |
| *C22C 38/04* | (2006.01) |

(52) U.S. Cl.
CPC .............. *B23K 31/02* (2013.01); *B32B 15/01* (2013.01); *B32B 15/011* (2013.01); *B32B 15/015* (2013.01); *B32B 15/04* (2013.01); *B32B 15/043* (2013.01); *B32B 15/18* (2013.01); *C21D 1/18* (2013.01); *C21D 8/0226* (2013.01); *C21D 8/0236* (2013.01); *C21D 8/041* (2013.01); *C21D 8/0426* (2013.01); *C21D 8/0436* (2013.01); *C21D 8/0463* (2013.01); *C21D 8/0473* (2013.01); *C21D 9/48* (2013.01); *C22C 38/001* (2013.01); *C22C 38/002* (2013.01); *C22C 38/02* (2013.01); *C22C 38/06* (2013.01); *C22C 38/08* (2013.01); *C22C 38/12* (2013.01); *C22C 38/14* (2013.01); *C22C 38/18* (2013.01); *C22C 38/22* (2013.01); *C22C 38/26* (2013.01); *C22C 38/28* (2013.01); *C22C 38/32* (2013.01); *C22C 38/34* (2013.01); *C22C 38/38* (2013.01); *C22C 38/40* (2013.01); *C22C 38/44* (2013.01); *C22C 38/48* (2013.01); *C22C 38/50* (2013.01); *C22C 38/54* (2013.01); *C23C 2/02* (2013.01); *C23C 2/022* (2022.08); *C23C 2/024* (2022.08); *C23C 2/026* (2022.08); *C23C 2/06* (2013.01); *C23C 2/12* (2013.01); *C23C 2/18* (2013.01); *C23C 2/34* (2013.01); *C23C 2/40* (2013.01); *C23C 30/00* (2013.01); *C23C 30/005* (2013.01); *B23K 2101/16* (2018.08); *B23K 2101/18* (2018.08); *B23K 2103/04* (2018.08); *B23K 2103/18* (2018.08); *B32B 15/012* (2013.01); *B32B 15/013* (2013.01); *B32B 2038/0048* (2013.01); *B32B 2250/03* (2013.01); *B32B 2250/40* (2013.01); *B32B 2307/536* (2013.01); *B32B 2307/552* (2013.01); *B32B 2307/72* (2013.01); *C21D 1/25* (2013.01); *C21D 2211/001* (2013.01); *C21D 2211/002* (2013.01); *C21D 2211/004* (2013.01); *C21D 2211/005* (2013.01); *C21D 2211/008* (2013.01); *C21D 2251/02* (2013.01); *C22C 38/04* (2013.01); *Y10T 428/12451* (2015.01); *Y10T 428/12493* (2015.01); *Y10T 428/12729* (2015.01); *Y10T 428/12757* (2015.01); *Y10T 428/12799* (2015.01); *Y10T 428/12958* (2015.01); *Y10T 428/12965* (2015.01); *Y10T 428/12972* (2015.01); *Y10T 428/12979* (2015.01); *Y10T 428/12993* (2015.01); *Y10T 428/2495* (2015.01); *Y10T 428/24959* (2015.01); *Y10T 428/24967* (2015.01); *Y10T 428/24992* (2015.01); *Y10T 428/26* (2015.01); *Y10T 428/263* (2015.01); *Y10T 428/264* (2015.01); *Y10T 428/265* (2015.01)

(58) Field of Classification Search
CPC ............ B32B 2038/0048; B32B 15/01; B32B 15/011; B32B 15/015; B32B 15/04; B32B 15/043; B32B 15/18; B32B 15/012; B32B 15/013; B32B 38/004; B23K 2101/16; B23K 2101/18; B23K 20/04; B23K 20/227; B23K 20/24; B23K 31/02; B23K 2103/04; B23K 2103/18; C21D 1/18; C21D 1/25; C21D 8/0226; C21D 8/0236; C21D 8/041; C21D 8/0426; C21D 8/0436; C21D 8/0463; C21D 8/0473; C21D 9/46; C21D 2211/001; C21D 2211/002; C21D 2211/004; C21D 2211/005; C21D 2211/008; C21D 2251/02; C22C 38/001; C22C 38/002; C22C 38/02; C22C 38/06; C22C 38/08; C22C 38/12; C22C 38/14; C22C 38/18; C22C 38/22; C22C 38/26; C22C 38/28; C22C 38/32; C22C 38/34; C22C 38/38; C22C 38/40; C22C 38/44; C22C 38/48; C22C 38/50; C22C 38/54; C22C 38/04; C23C 2/02; C23C 2/022; C23C 2/024; C23C 2/026; C23C 2/06; C23C 2/12; C23C 2/18; C23C 2/34; C23C 2/40; C23C 30/00; C23C 30/005; Y10T 428/12451; Y10T 428/12493; Y10T 428/12729; Y10T 428/12757; Y10T 428/12799; Y10T 428/12958; Y10T 428/12965; Y10T 428/12972; Y10T 428/12979; Y10T 428/12993; Y10T 428/2495; Y10T 428/24959; Y10T 428/24967; Y10T 428/24992; Y10T 428/26; Y10T 428/263; Y10T 428/264; Y10T 428/265

See application file for complete search history.

(56) References Cited

U.S. PATENT DOCUMENTS

| | | |
|---|---|---|
| 2009/0165897 A1 | 7/2009 | McEwan |
| 2009/0297387 A1 | 12/2009 | Chin et al. |
| 2010/0003540 A1 | 1/2010 | Koseki et al. |
| 2013/0189539 A1 | 7/2013 | Van De Langkruis et al. |
| 2013/0295409 A1 | 11/2013 | Chin et al. |
| 2017/0218471 A1 | 8/2017 | Bongards et al. |
| 2018/0272461 A1 | 9/2018 | Sikora et al. |
| 2019/0153559 A1 | 5/2019 | Song et al. |

FOREIGN PATENT DOCUMENTS

| | | |
|---|---|---|
| CN | 107226301 | 10/2017 |
| EP | 1309734 | 5/2003 |
| EP | 1846584 | 10/2007 |
| EP | 2128293 | 12/2009 |
| EP | 3835055 | 6/2021 |
| JP | S63194880 A | 8/1988 |
| JP | 2006118000 | 5/2006 |
| JP | 4343431 B2 | 10/2009 |
| JP | 2009235492 | 10/2009 |
| JP | 2010077531 | 4/2010 |
| JP | 5221348 | 6/2013 |
| KR | 20090038008 | 4/2009 |
| KR | 20090123229 | 12/2009 |
| KR | 20120065464 | 6/2012 |
| KR | 20160078839 | 7/2016 |
| KR | 101758567 | 7/2017 |
| KR | 20170075138 | 7/2017 |
| WO | 2017054862 | 4/2017 |
| WO | 2017222342 | 12/2017 |

OTHER PUBLICATIONS

European Search Report—European Application No. 19839864.6 issued on Aug. 20, 2021, citing WO 2017/222342, EP 1846584, EP 3835055, EP 2128293, KR 10-2016-0078839, EP 1309734, WO 2017/054862, and Serajzadeh et al.
International Search Report—PCT/KR2019/008381 dated Oct. 14, 2019.
Japanese Office Action—Japanese Application No. 2021-502939 issued on Feb. 15, 2022, citing JP 2019-524986, JP 2006-118000, JP 2014-501852, and KR 10-2017-0075138.
Serajzadeh et al., Prediction of temperature distribution in the hot rolling of slabs, Modelling and Simulation in Materials Science and Engineering, 2002, vol. 10, pp. 185-203.
European Office Action—European Application No. 19839864.6 issued on Mar. 14, 2024, citing JP S63-194880 and JP 4343431.

METHOD OF MANUFACTURING CLAD STEEL SHEET HAVING EXCELLENT FORMABILITY AND FATIGUE PROPERTY

TECHNICAL FIELD

The present disclosure relates to a low-density clad steel sheet having excellent formability and fatigue properties that may be used for chassis structural members of a vehicle or the like, and a manufacturing method therefor.

BACKGROUND ART

In recent years, due to the regulation of carbon dioxide for reducing global warming, there has been strong demand for the lightening of vehicles. At the same time, ultra-high strengthening of steel sheets of the vehicles has been continuously undertaken in order to improve the safety of passengers.

Among components of the vehicles, chassis components such as lower arms, subframes, or the like may be located below a center of gravity of vehicles, so an effect of reducing fuel consumption by the lightening of components may be significantly increased. The usage of lightweight materials such as aluminum or the like may be considered in order to maximize such a lightening effect. However, since the lightweight materials such as aluminum or the like may be produced by a casting method when manufacturing the components due to poor formability and weldability, there may be a disadvantage of relatively high component manufacturing costs, and it may be difficult to ensure the safety of passengers due to relatively low strength.

Meanwhile, the chassis components should have excellent fatigue properties in order to prevent failure due to fatigue when driving. Since the fatigue properties of steel materials may generally increase in proportion to yield strength of the steel materials, yield strength of the steel materials should be high and formability of the steel materials should be excellent to be suitable for cold press forming at the same time. In general, a low-temperature transformation structure may be used to produce a steel sheet for the chassis components of the vehicles. However, in this case, there may be a problem that it is difficult to secure relatively high strength and formability suitable for cold press forming at the same time.

In a case of mechanical structural members, a method of remarkably improving fatigue performance by creating a martensite layer having high yield strength locally only on a surface by a high frequency hardening treatment or a surface flame treatment after molding has generally been used. However, due to a relatively thin thickness and a relatively complex shape of components of the vehicles, it may be practically difficult to apply the surface hardening treatment to structural members for vehicles.

In the meantime, Korean Patent Application Publication No. 2012-0065464 discloses that a large amount of manganese and aluminum is added to carbon steel to make more than 90% of austenite in a microstructure, to have excellent strength and formability and an excellent lightening effect due to low density at the same time. However, in the conventional lightweight steel materials including the steel material disclosed in Korean Patent Publication No. 2012-0065464 above, only tensile strength, elongation, and low density have been considered, but improvement of fatigue properties for ensuring stability of the vehicle in consideration of characteristics of vehicle members on which stress is concentrated for a long time has been not mentioned.

Since fatigue failure of chassis components may have a disadvantage that it is difficult to determine whether it is progressing when using, and may have a significant adverse effect on safety of passengers due to fatigue when driving, safety factors should be raised and applied conservatively, and it may be ideal to design below a fatigue limit in a fatigue mode. Therefore, when the chassis components is made lighter using a material with a high fatigue limit and low density, excellent fuel economy savings may be expected.

Accordingly, in order to maximize lightening of chassis components, it is required to develop a steel material for vehicles having excellent formability and fatigue properties and low density at the same time.

DISCLOSURE

Technical Problem

An aspect of the present disclosure is to provide a clad steel sheet having excellent formability and low density, and excellent fatigue properties at the same time, and a manufacturing method therefor.

The object of the present disclosure is not limited to the above description. The object of the present disclosure can be understood from the entire contents of the present specification, and will be understood by those skilled in the art that there would be no difficulty in understanding the additional object of the present disclosure.

Technical Solution

According to an aspect of the present disclosure, a low-density clad steel sheet having excellent formability and fatigue properties, includes a base material, and cladding materials provided on both side surfaces of the base material, wherein the base material is a lightweight steel sheet including, by weight, C: 0.3 to 1.0%, Mn: 4.0 to 16.0%, Al: 4.5 to 9.0%, and a remainder of Fe and inevitable impurities, and each of the cladding materials is martensitic carbon steel including, by weight, C: 0.1 to 0.45%, Mn: 1.0 to 3.0%, and a remainder of Fe and inevitable impurities.

According to another aspect of the present disclosure, a method of manufacturing a low-density clad steel sheet having excellent formability and fatigue properties, includes: preparing a base material, a lightweight steel sheet including, by weight, C: 0.3 to 1.0%, Mn: 4.0 to 16.0%, Al: 4.5 to 9.0%, and a remainder of Fe and inevitable impurities; preparing cladding materials, each of which is martensitic carbon steel including, by weight, C: 0.1 to 0.45%, Mn: 0.1 to 3.0%, and a remainder of Fe and inevitable impurities; disposing the base material between two of the cladding materials to obtain a laminate; welding an edge of the laminate, and heating the welded laminate to a temperature within a range of 1050 to 1350° C.; finish-rolling the heated laminate to a temperature within a range of 750 to 1050° C. with a rolling reduction ratio of 30% or more in a first pass, to obtain a hot-rolled steel sheet; coiling the hot-rolled steel sheet at a temperature within a range of 400 to 700° C.; pickling the coiled hot-rolled steel sheet, and applying a cold-reduction ratio of 35 to 90% thereto to obtain a cold-rolled steel sheet; and annealing the cold-rolled steel sheet at a temperature in a range of 550° C. or higher and A3+200° C. or lower of the cladding materials.

In addition, the solution of the above-mentioned problems does not list all the features of the present disclosure. The various features of the present disclosure and the advantages and effects thereof may be understood in more detail with reference to the following specific embodiments.

Advantageous Effects

According to an aspect of the present disclosure, there may be effects that a clad steel sheet having a density of 7.4 g/cm$^3$ or less and a fatigue strength of 500 MPa or more, to be applied to chassis components of a vehicle, and having an excellent elongation of 25% or more, to be applied to cold press forming, and a manufacturing method therefor are provided.

BEST MODE FOR INVENTION

Figure 1:
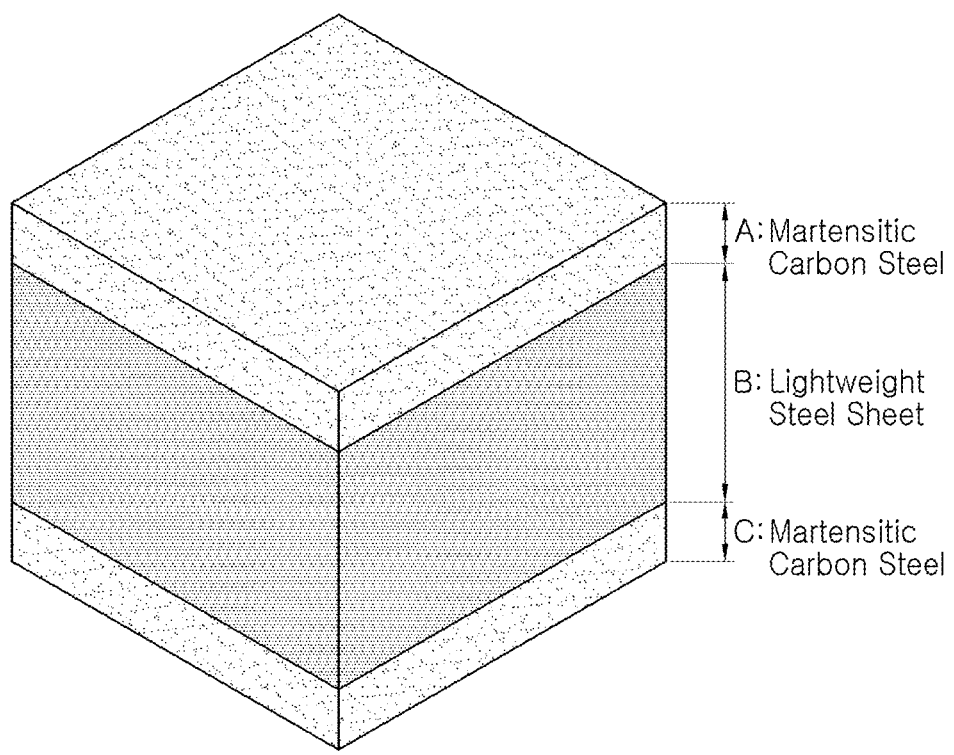
FIG. 1 is a diagram schematically illustrating a clad steel sheet of the present disclosure in which a lightweight steel sheet is used as a base material B and martensitic carbon steel is used as cladding materials A and C.

Hereinafter, embodiments of the present disclosure will be described. However, the embodiments of the present disclosure may be modified to have various other forms, and the scope of the present disclosure is not limited to the embodiments described below. Further, the embodiments of the present disclosure are provided to more fully explain the present disclosure to those skilled in the art.

The present inventors have found that a steel material having high tensile strength and low density in a conventional lightweight steel sheet may be manufactured, but there is a problem in which fatigue performance is poor due to low yield strength. Thus, deep research into a solution thereof has been conducted.

A fatigue fracture may reach a final fracture through generation and propagation processes of fatigue cracks, and in fatigue life, it is known that the generation process of the fatigue cracks occupies about 70% of an entire life cycle. It may be important to effectively prevent formation of fatigue cracks. Although fatigue cracks are known to be generated in surfaces, internal inclusions, grain boundaries, or the like, in real components, most cases may be mainly generated in the surface. This is because an amount of stress applied in a bending fatigue mode applied in an actual use environment may be the highest in the surface. As a result, it was confirmed that a martensitic steel material having high yield strength and high resistance to fatigue cracks is disposed externally, and a lightweight steel sheet having excellent formability and low density is included as a base material, to manufacture a composite steel sheet, to achieve excellent formability and low density. In addition, a steel sheet for vehicles having excellent fatigue characteristics may be manufactured. Accordingly, the present disclosure is completed on the basis of the features described above.

Hereinafter, a low-density clad steel sheet having excellent formability and fatigue properties according to an aspect of the present disclosure will be described in detail.

The low-density clad steel sheet having excellent formability and fatigue properties according to an aspect of the present disclosure includes a base material, and cladding materials provided on both side surfaces of the base material, wherein the base material is a lightweight steel sheet including, by weight, C: 0.3 to 1.0%, Mn: 4.0 to 16.0%, Al: 4.5 to 9.0%, and a remainder of Fe and inevitable impurities, and each of the cladding materials is martensitic carbon steel including, by weight, C: 0.1 to 0.45%, Mn: 1.0 to 3.0%, and a remainder of Fe and inevitable impurities.

Hereinafter, the base material and the cladding materials of the present disclosure will be described, respectively, and then the clad steel sheet including the cladding materials provided on both side surfaces of the base material will be described.

Base Material (Lightweight Steel Sheet)

Hereinafter, the alloy composition of the lightweight steel sheet constituting the base material of the clad steel sheet, which may be an aspect of the present disclosure, will be described in detail. Units of each of the element content are by weight, unless otherwise specified.

Carbon (C): 0.3~1.0%

Carbon may be an element that contributes to stabilization of an austenite phase, and as its content increases, it may be advantageous in securing the austenite phase. An austenite phase distributed in a microstructure of the lightweight steel sheet may play a role of simultaneously increasing strength and elongation of the lightweight steel sheet. When the carbon content is less than 0.3%, it may be difficult to secure tensile strength and elongation of the lightweight steel sheet. On the other hand, when the content exceeds 1.0%, cementite and kappa carbide may be generated in the lightweight steel sheet to increase strength of the lightweight steel sheet, but significantly reduce ductility of the lightweight steel sheet. In particular, in the lightweight steel sheet to which aluminum is added, since kappa carbide precipitates at grain boundaries and causes brittleness, an upper limit of the carbon content may be set to 1.0%. Therefore, in the present disclosure, the carbon content may be limited to 0.3 to 1.0%.

Manganese (Mn): 4.0~16.0%

Manganese may be an element that stabilizes the austenite phase together with the carbon, and acts to suppress formation of carbide by increasing solubility of the carbon in the austenite phase. In addition, manganese may play a role in lowering density of the lightweight steel sheet because it decreases a density of the lightweight steel sheet by increasing a lattice constant of the lightweight steel sheet. When the manganese content is less than 4.0%, it may be difficult to expect an effect of suppressing the formation of the carbide. When the manganese content exceeds 16.0%, there may be a problem of forming a band structure by central segregation to lower ductility of the lightweight steel sheet. Therefore, in the present disclosure, the manganese content may be limited to 4.0 to 16.0%.

Aluminum (Al): 4.5~9.0%

In the present disclosure, aluminum may be the most important element that plays a role in reducing the density of the lightweight steel sheet. For this, aluminum may be added in an amount of 4.5% or more. Although a large amount of aluminum may be added to reduce the density of the lightweight steel sheet, but when such a large amount of aluminum is added, an upper limit of the aluminum content may be 9.0% because amounts of kappa carbide or intermetallic compounds such as FeAl, Fe$_3$Al, or the like may increase and ductility of the lightweight steel sheet may decrease. Therefore, in the present disclosure, the aluminum content may be limited to 4.5 to 9.0%.

The remainder of components in the embodiment of the present disclosure is iron (Fe). However, in the ordinary manufacturing process, impurities which are not intended may be inevitably mixed from a raw material or a surrounding environment, which may not be excluded. These impurities are known to those skilled in the art and thus, are not specifically mentioned in this specification.

In addition to the above composition, the lightweight steel sheet constituting the base material may further include, by weight, Si: 0.03 to 2.0%, Ni: 0.1 to 4.0%, N: 0.04% or less (excluding 0%), P: 0.03% or less, and S: 0.03% or less.

Silicon (Si): 0.03~2.0%

Silicone may be an element that may be added to improve yield strength and tensile strength of the lightweight steel sheet by solid solution strengthening. Silicon may be used as a deoxidizing agent, and thus may be contained in the lightweight steel sheet in an amount of 0.03% or more. When the silicon content exceeds 2.0%, a large amount of silicon oxide may be formed on a surface of the lightweight steel sheet during hot-rolling to reduce pickling properties of the lightweight steel sheet, and may increase electrical resistivity of the lightweight steel sheet to lower weldability of the lightweight steel sheet. Therefore, in the present disclosure, the silicon content may be limited to 0.03 to 2.0%.

Nickel (Ni): 0.1~4.0%

Nickel, together with manganese, may increase stability of the austenite phase, and may increase strength and ductility of the lightweight steel sheet. Therefore, nickel, together with manganese, may be added to increase strength and ductility of the lightweight steel sheet. However, when nickel is added in a large amount, there may be a problem that manufacturing costs of the lightweight steel sheet increase, the nickel content may be limited to 4.0% or less. When nickel is added in an amount of less than 0.1%, an effect of increasing strength and ductility of the lightweight steel sheet may not be remarkable. Therefore, in the present disclosure, the nickel content may be limited to 0.1 to 4.0%.

Nitrogen (N): 0.04% or Less (Excluding 0%)

Nitrogen may be an impurity that may be inevitably contained. Nitrogen may be an element that reacts with aluminum to precipitate fine nitrides to lower workability of the lightweight steel sheet. Therefore, the nitrogen content may be controlled to be as low as possible. Theoretically, nitrogen may be inevitably contained in the manufacturing process. Therefore, it is important to control an upper limit thereof, and in the present disclosure, the upper limit of the nitrogen content may be controlled to be 0.04%.

Phosphorus (P): 0.03% or Less

Phosphorus may be an impurity that may be inevitably contained. Phosphorus may be an element that mainly causes deterioration in workability of the lightweight steel sheet by segregation. Therefore, the phosphorus content may be controlled to be as low as possible. Theoretically, the phosphorus content is advantageous to be limited to 0%. Phosphorus may be inevitably contained in the manufacturing process. Therefore, it is important to control an upper limit thereof, and in the present disclosure, the upper limit of the phosphorus content may be controlled to be 0.03%.

Sulfur(S): 0.03% or Less

Sulfur may be an impurity that may be inevitably contained, which forms a coarse manganese sulfide (MnS) to cause defects such as flange cracks and greatly reduces hole expandability of the lightweight steel sheet. Therefore, the sulfur content may be controlled to be as low as possible. Theoretically, the sulfur content may be advantageously limited to 0%, but it is inevitably contained in the manufacturing process. Therefore, it is important to control an upper limit thereof, and in the present disclosure, the upper limit of the sulfur content may be controlled to be 0.03%.

In the present disclosure, it may be preferable that the lightweight steel sheet constituting the base material not only may satisfy the above component system, but also may include 10 area % or more of retained austenite as the microstructure of the lightweight steel sheet. The retained austenite may improve formability of the lightweight steel sheet by induced plastic transformation or induced twin formation during deformation. Therefore, when the content thereof is less than 10 area %, an elongation of 25% or more may not be secured. When the fraction of austenite may not limit an upper limit thereof, since it has excellent formability of the lightweight steel sheet as an amount thereof increases. In the present disclosure, strength, low density, and elongation of the lightweight steel sheet may be simultaneously secured by securing the microstructure as described above.

Cladding Material (Martensitic Carbon Steel)

Hereinafter, the alloy composition of the martensitic carbon steel constituting each of the cladding materials of the clad steel sheet, which may be an aspect of the present disclosure, will be described in detail. Units of each of the element content are by weight, unless otherwise specified.

Carbon (C): 0.1~0.45%

Carbon may be an element that increases hardenability of the martensitic carbon steel, may be an element that facilitates securing a martensite structure, and may be an element that locates in an interstitial site in the martensite structure to improve strength of the martensitic carbon steel by solid solution strengthening. When the carbon content is less than 0.1%, initiation of martensite transformation may take place at a relatively high temperature. Therefore, since carbon during a cooling operation may be diffused by dislocation, strength of the martensitic carbon steel by solid solution strengthening may not be expected. When the content thereof exceeds 0.4%, weldability of the clad steel sheet may be reduced. Therefore, in the present disclosure, the content of carbon may be limited to 0.1 to 0.45%.

Manganese (Mn): 1.0-3.0%

Manganese may be an element that increases hardenability of the martensitic carbon steel and improves strength of the martensitic carbon steel. The manganese content may be 1.0% or more to obtain such an effect. Meanwhile, when the manganese content exceeds 3.0%, a structure of a segregation layer may lower formability of the martensitic carbon steel. Therefore, in the present disclosure, the manganese content may be limited to 1.0 to 3.0%.

The remaining component of each of the cladding materials may be iron (Fe). Since impurities that are not intended may be inevitably incorporated from a raw material or surrounding environment in the ordinary manufacturing process, the impurities may not be excluded. These impurities are not specifically mentioned in this specification, as they are known to any person skilled in the art of steel manufacturing.

In addition to the above composition, the martensitic carbon steel constituting each of the cladding materials may further include, by weight, Si: 0.03 to 2.0%, Al: 0.02 to 0.3%, N: 0.04% or less (excluding 0%), B: 0.0005 to 0.005%, P: 0.03% or less, and S: 0.03% or less.

Silicon (Si): 0.03~2.0%

Silicon may be dissolved in the martensitic carbon steel to improve strength of the martensitic carbon steel. Silicon may be an element present in ingot steel as an impurity, causing excessive costs to be controlled to be lower than 0.03%. When the silicon content exceeds 1.0%, silicon may generate surface oxides and may lower surface quality of the martensitic carbon steel during an annealing operation. Therefore, the silicon content may be limited to 0.03 to 2.0%.

Aluminum (Al): 0.02~0.3%

Aluminum may be an element commonly added for deoxidation of the martensitic carbon steel. Excessive costs may be required to control the aluminum content to lower than 0.02%. Aluminum may be an element that raises an initiation temperature of martensitic transformation to deteriorate hardenability of the martensitic carbon steel. In addition, when the aluminum content exceeds 0.3%, surface oxides may be generated during annealing to deteriorate a surface quality of the martensitic carbon steel. Therefore, the aluminum content may be limited to 0.02 to 0.3%.

Nitrogen (N): 0.04% or Less (Excluding 0%)

Nitrogen may be an element that may be inevitably contained. Aluminum nitride (AlN) produced by reacting with aluminum remaining in the martensitic carbon steel may cause surface cracking during a continuous casting process. Therefore, the nitrogen content may be controlled to be as low as possible, but nitrogen may be inevitably contained in the manufacturing process. Therefore, it is important to control an upper limit thereof, and in the present disclosure, the upper limit of the nitrogen content may be controlled to be 0.04%.

Boron (B): 0.0005~0.005%

Boron may be an element that segregates at austenite grain boundaries to reduce energy of the grain boundaries and improves hardenability of the martensitic carbon steel. For this, boron is preferably contained in an amount of 0.0005% or more. When the boron content exceeds 0.005%, oxide may be formed on a surface to lower a surface quality of the martensitic carbon steel. Therefore, the boron content may be limited to 0.0005% to 0.005%.

Phosphorus (P): 0.03% or Less

Phosphorus may be an impurity that may be inevitably contained. Phosphorus may be an element that mainly causes deterioration in workability of the martensitic carbon steel by segregation. Therefore, the phosphorus content may be controlled to be as low as possible. Theoretically, the phosphorus content is advantageous to be limited to 0%. Phosphorus may be inevitably contained in the manufacturing process. Therefore, it is important to control an upper limit thereof, and in the present disclosure, the upper limit of the phosphorus content may be controlled to be 0.03%.

Sulfur(S): 0.03% or Less

Sulfur may be an impurity that may be inevitably contained, which forms a coarse manganese sulfide (MnS) to cause defects such as flange cracks and greatly reduces hole expandability of the martensitic carbon steel. Therefore, the sulfur content may be controlled to be as low as possible. Theoretically, the sulfur content may be advantageously limited to 0%, but it is inevitably contained in the manufacturing process. Therefore, it is important to control an upper limit thereof, and in the present disclosure, the upper limit of the sulfur content may be controlled to be 0.03%.

In addition to the above composition, the martensitic carbon steel constituting each of the cladding materials may further include, by weight, one or more of Cr: 0.1 to 1.0%, Ni: 0.1 to 1.0%, Mo: 0.05 to 1.0%, Ti: 0.005 to 0.05%, and Nb: 0.005 to 0.05%.

Chromium (Cr): 0.1~1.0%

Chromium may be an element that improves hardenability of the martensitic carbon steel, and may be an element that promotes formation of a low-temperature transformation phase to improve strength of the martensitic carbon steel. The chromium content may be 0.1% or more to obtain such an effect. When the chromium content exceeds 1.0%, an excessive increase in manufacturing costs may be caused, as compared with an intended strength improvement effect. Therefore, the chromium content may be limited to 0.1 to 1.0%.

Nickel (Ni): 0.1~1.0%

Nickel may be an element that improves hardenability of the martensitic carbon steel, and may be an element that improves strength of the martensitic carbon steel. The nickel content may be 0.1% or more to obtain such an effect. When the nickel content exceeds 1.0%, an excessive increase in manufacturing cost may be caused, as compared with an intended strength improvement effect. Therefore, the nickel content may be limited to 0.1 to 1.0%.

Molybdenum (Mo): 0.05~1.0%

Molybdenum may be an element that improves hardenability of the martensitic carbon steel, promotes formation of a low-temperature transformation phase to improve strength of the martensitic carbon steel, and forming carbides in the martensitic carbon steel to improve strength of the martensitic carbon steel. The molybdenum content may be 0.05% or more to obtain such an effect. When the molybdenum content exceeds 1.0%, an excessive increase in manufacturing cost may be caused, as compared with an intended strength improvement effect. Therefore, the molybdenum content may be limited to 0.05 to 1.0%.

Titanium (Ti): 0.005~0.05%

Titanium may play a role in increasing strength of the martensitic carbon steel by reacting with nitrogen and carbon in the martensitic carbon steel to form carbonitrides. For this, titanium may be contained in an amount of 0.005% or more. When the titanium content exceeds 0.05%, precipitates may be formed excessively, and castability thereof may be deteriorated. Therefore, the titanium content may be limited to 0.005 to 0.05%.

Niobium (Nb): 0.005~0.05%

Niobium may be an element that forms carbonitride, such as titanium, and may play a role in increasing strength of the martensitic carbon steel by reacting with nitrogen and carbon in the martensitic carbon steel. For this, niobium may be contained in an amount of 0.005% or more. When the niobium content exceeds 0.05%, precipitates may be formed excessively, and castability thereof may be deteriorated. Therefore, the niobium content may be limited to 0.005 to 0.05%.

Meanwhile, in the present disclosure, the martensitic carbon steel constituting each of the cladding materials may not only satisfy the above-mentioned component system, but also a microstructure may have martensite as a matrix structure, and one or more of retained austenite, ferrite, bainite, and carbide as the remainder. Preferably, an area fraction of the martensite may be 65 area % or more. By securing the above-mentioned microstructure, excellent tensile strength and yield strength of the martensitic carbon steel may be obtained.

In addition, by a tempering treatment, the microstructure may have tempered martensite as a matrix structure, and one or more of retained austenite, ferrite, bainite, and carbide as the remainder. Preferably, an area fraction of the tempered martensite may be 65 area % or more. The martensite transformation according to the tempering treatment may be to improve toughness of the martensitic carbon steel by removing residual stress generated in the martensitic carbon steel.

Clad Steel Sheet

A clad steel sheet according to one aspect of the present disclosure may include a base material, and cladding materials provided on both side surfaces of the base material. FIG. 1 is a diagram schematically illustrating a clad steel sheet of the present disclosure in which a lightweight steel sheet is used as a base material B and martensitic carbon steel is used as cladding materials A and C A clad steel sheet may be defined as a laminate type composite material in which two or more surfaces of metal materials are metallurgically bonded and integrated. In general, clad steel sheets have been used for special purposes such as (to withstand) extreme corrosive environments or the like using noble metals such as nickel (Ni) and copper (Cu) as cladding materials.

The base material, which may be an internal steel material of the present disclosure, may be a lightweight steel sheet having low density and excellent formability by adding a large amount of manganese and aluminum. The lightweight steel sheet may have excellent tensile strength, but may have low yield strength, and may be therefore unsuitable for use as a chassis component requiring fatigue properties.

The cladding material, which may be an external steel material of the present disclosure, may be a martensitic carbon steel having excellent yield strength and tensile strength at the same time. The martensitic carbon steel may have low elongation, and it may be difficult to secure formability required for cold press forming.

The reason for the low elongation of the martensitic steel material may be due to a phenomenon that uniform elongation is low due to local concentration of deformation during molding. The present inventors found a phenomenon in which when a lightweight steel sheet including a large amount of austenite phase is disposed therebetween, local concentration of deformation of the martensitic steel material may be prevented and formability of the martensitic steel material may be improved.

Therefore, in the present disclosure, the lightweight steel sheet including the above-described austenite may be used as the base material, and the above-described martensitic carbon steel may be included on both side surfaces of the base material, to overcome respective disadvantages of the lightweight steel sheet and the martensitic carbon steel, have excellent formability and fatigue properties at the same time, and get an effect of low density.

In this case, a thickness of one (1) cladding material among the cladding materials may be 20 µm or more, and a total thickness of the cladding materials may be 30% or less of a thickness of the clad steel sheet. In this case, the thickness of the one (1) cladding material may refer to a thickness of one (1) cladding material provided on one side surface of the base material, and the thickness of the cladding materials may refer to the sum of thicknesses of two cladding materials provided on both side surfaces of the base material. In addition, the thickness of the clad steel sheet may refer to the thickness of the base material plus the total thickness of the cladding materials. When a plated layer is formed on one surface of the one (1) cladding material, a thickness of the plated layer may be also included. In hot-rolling and annealing processes in the manufacturing process, a gradient of element concentration due to a difference in type of components may occur between the base material and the cladding materials, and diffusion of the element may proceed at an interface therebetween. In this case, since aluminum may be moved from the base material having a high content to the cladding material, a region having a high aluminum content may be locally generated in the cladding materials. Since aluminum serves to increase an initiation temperature of the martensite to lower hardenability of the martensitic carbon steel, when aluminum diffuses into an interior of the cladding materials, aluminum may act as a cause of lowering strength of the cladding materials. In the present disclosure, when considering a diffusion distance of aluminum, it was found that a thickness of each of the cladding materials was 20 µm or more, which did not affect martensite transformation.

When a thickness of each of the cladding materials is excessively thick, a density of 7.4 g/cm$^3$ or less to be achieved in the present disclosure may not be secured. When the density may be 7.4 g/cm$^3$ or less, a weight reduction of 5% or more may be achieved, as compared to general steel. There may be some differences depending on the aluminum content contained in the base material, but when a thickness of each of the cladding materials is less than 30% of a thickness of the clad steel sheet, a density of the clad steel sheet may be secured to 7.4 g/cm$^3$ or less.

In addition, the base material and the cladding materials of the clad steel sheet of the present disclosure may be directly solid-phase bonded to each other. The base material of the present disclosure may include a large amount of aluminum, and the aluminum may be in contact with oxygen in the air to easily form an oxide film. When an aluminum oxide film or the like is interposed between the base material and the cladding materials, bonding between the base material and the cladding materials may be unstable, not to form a stable multilayer structure. Therefore, in order to manufacture a clad steel sheet having a stable structure, it may be necessary to suppress the formation of the oxide film as described above or remove the oxide film as much as possible.

Figure 2:
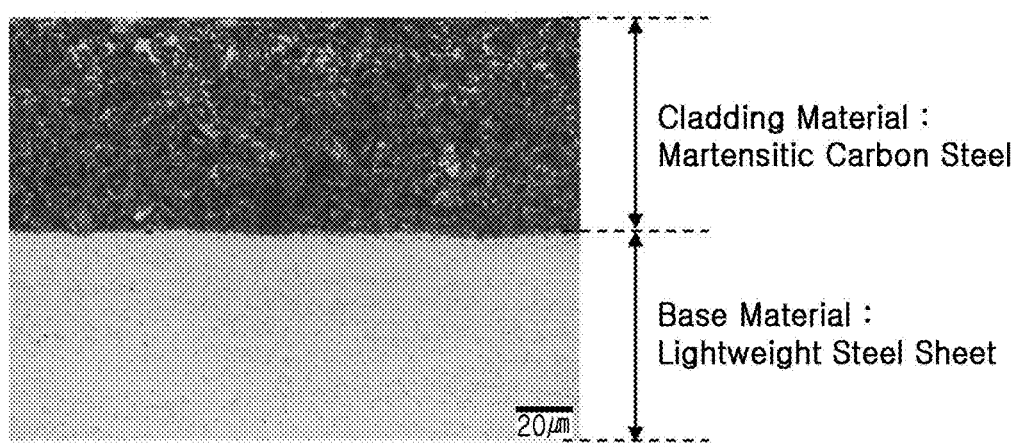
FIG. 2 is an optical microscope photograph showing a microstructure of a boundary between the base material and the cladding material of Inventive Example 1.
Figure 3:
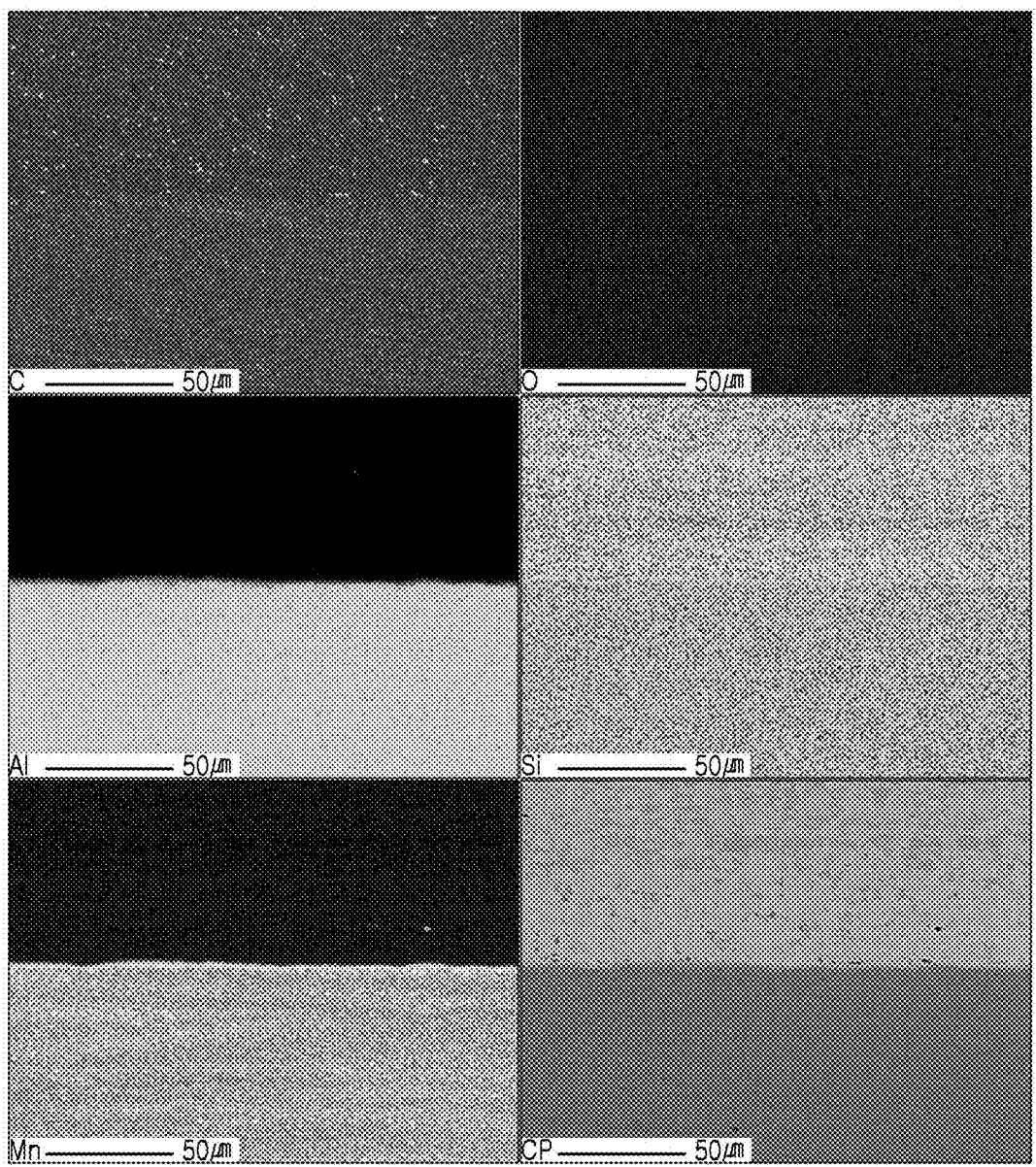
FIG. 3 is a scanning electron micrograph showing a state of element distribution at a boundary between the base material and the cladding material of Inventive Example 1.

To this end, in the present disclosure, the formation of an oxide film may be suppressed as much as possible by welding an edge when manufacturing a laminate to block oxygen intruding from the outside. At the same time, a reduction ratio of a first pass of rolling may be set to 30% or more to crush an oxide film formed by a trace amount of oxygen, to directly solid-phase bond the base material and the cladding materials. In the clad steel sheet of the present disclosure manufactured by such a manufacturing method, oxides such as aluminum oxide may not be observed at the bonding interface between the base material and the cladding materials, but may be observed that a solid-phase bond in which the base material and the cladding materials are directly solid-phase bonded is formed. FIG. 2 shows a scanning electron micrograph of Inventive Example 1 that satisfies the conditions of the present disclosure, and FIG. 3 shows element distribution states of C, O, Al, Si, Mn, and CP at boundaries between the base material and the cladding materials. As can be seen from the element distribution of FIG. 3, it may be easily confirmed that no specific structure including oxide may be observed at the bonding interface between the base material and the cladding materials.

Further, a Vickers hardness measured on a surface of the martensitic carbon steel constituting the cladding materials may be 400 Hv or more, and elongation of the clad steel sheet may be 25% or more. The surface hardness and elongation may be secured to be applied to chassis components of a vehicle or the like.

In addition, the clad steel sheet may further include a plated layer formed on the cladding materials, and the plated layer may be formed by a hot dip plating method, and may be one selected from the group consisting of a Zn-based plated layer, a Zn—Fe-based plated layer, a Zn—Al-based plated layer, a Zn—Mg-based plated layer, a Zn—Mg—Al-based plated layer, a Zn—Ni-based plated layer, an Al—Si-based plated layer, and an Al—Si—Mg-based plated layer.

Hereinafter, a method of manufacturing a low-density clad steel sheet having excellent formability and fatigue properties, which may be another aspect of the present disclosure, will be described in detail.

In another aspect of the present disclosure, a method of manufacturing a low-density clad steel sheet having excellent formability and fatigue properties, may include: preparing a base material, a lightweight steel sheet including, by weight, C: 0.3 to 1.0%, Mn: 4.0 to 16.0%, Al: 4.5 to 9.0%, and a remainder of Fe and inevitable impurities; preparing cladding materials, each of which is martensitic carbon steel including, by weight, C: 0.1 to 0.45%, Mn: 0.1 to 3.0%, and a remainder of Fe and inevitable impurities; disposing the base material between two of the cladding materials to obtain a laminate; welding an edge of the laminate, and heating the welded laminate to a temperature within a range of 1050 to 1350° C.; finish-rolling the heated laminate to a temperature within a range of 750 to 1050° C. with a rolling reduction ratio of 30% or more in a first pass, to obtain a hot-rolled steel sheet; coiling the hot-rolled steel sheet at a temperature within a range of 400 to 700° C.; pickling the coiled hot-rolled steel sheet, and applying a cold-reduction ratio of 35 to 90% thereto to obtain a cold-rolled steel sheet; and annealing the cold-rolled steel sheet at a temperature in a range of 550° C. or higher and A3+200° C. or lower of the cladding materials.

After preparing a base material and cladding materials, satisfying the above-described alloy composition, the base material may be disposed between two of the cladding materials to obtain a laminate. In this case, surfaces of the base material and the cladding materials may be cleaned before the lamination.

The method of manufacturing the base material and the cladding materials may not be particularly limited since they may be produced by a general manufacturing process. As a preferred example, the base material may be manufactured by casting ingot steel produced in an electric furnace or a blast furnace, and the cladding material may be manufactured by refining and casting ingot steel produced in a blast furnace to control the content of impurities that may inevitably be contained.

After welding an edge of the laminate, the welded laminate may be heated to a temperature within a range of 1050 to 1350° C. The welding the edge of the laminate may prevent oxygen from entering between the base material and the cladding materials, and may prevent generation of oxides at the bonding interface during heating.

When a temperature range during heating is lower than 1050° C., a finish-rolling temperature during hot-rolling may be difficult to secure. In addition, since a rolling load may be increased due to a decrease in temperature, sufficient rolling to a predetermined thickness may be difficult to be carried out. When a heating temperature exceeds 1350° C., it may be not preferable since crystal grain size increases and oxidation of a surface of the laminate tends to occur to decrease strength of the laminate or to deteriorate the surface. Further, since a liquid phase film may be formed on a columnar grain boundary of a slab in a continuous casting process, cracks may occur during subsequent hot-rolling. Therefore, the heating temperature may be limited to 1050 to 1350° C.

The heated laminate may be subjected to finish-rolling at a temperature within a range of 750 to 1050° C. with a rolling reduction ratio of 30% or more in a first pass, to obtain a hot-rolled steel sheet.

It may be very important in the present disclosure to ensure that a rolling reduction ratio in the first pass during hot-rolling is 30% or more. Even when the edge of the laminate is welded to block oxygen from the outside intruding during heating in manufacturing the laminate, a large amount of aluminum contained in the lightweight steel sheet constituting the base material may form an oxide film even with a trace amount of oxygen present in the laminate. When such an interfacial oxide is interposed between the base material and the cladding materials, bonding strength between the base material and the cladding materials may be weakened to cause plate separation.

More specifically, the present inventors found that when a rolling reduction ratio in the first pass of rolling is 30% or more, an oxide may be crushed at the same time as rolling, and cladding materials and a base material, not oxidized, may be bonded to each other at a high temperature between the crushed aluminum oxide to form a solid-phase junction, to obtain a stable multilayer structure. In addition, since an area of the interfacial oxide may not increase significantly even when an amount of rolling increases, but an area of the solid-phase junction increases in proportion to the amount of rolling, it may be very important to maintain the bonding in the first pass of rolling. When the bonding is maintained, subsequent rolling may proceed without difficulty.

When the rolling reduction ratio in the first pass is less than 30%, the area of the solid-phase junction may be insufficient and no sufficient junction strength may be secured. Therefore, the plate separation may proceed and continuous oxidation may occur due to oxygen infiltrating separated plates, not to form a multilayer structure. Therefore, rather than managing the total reduction ratio of hot-rolling, it may be very important to manage a reduction ratio in the first pass to be 30% or more.

When a finish-rolling temperature is less than 750° C., there may be a problem in that the rolling load may increase, which overloads a rolling mill. When the finish-rolling temperature exceeds 1050° C., there may be a concern that surface oxidation may occur during rolling. Therefore, the finish-rolling temperature may be limited to 750 to 1050° C.

The hot-rolled steel sheet may be coiled at 400 to 700° C. When a coiling temperature is less than 400° C., a low-temperature transformation phase may be generated during cooling, and strength of the hot-rolled steel sheet may excessively increase, which may act as a cause of increasing rolling load during cold-rolling. When the coiling temperature exceeds 700° C., a thick oxide film may be formed on a surface of the hot-rolled steel sheet, which makes it difficult to control an oxide layer during pickling. Therefore, the coiling temperature may be limited to 400 to 700° C.

After pickling the coiled hot-rolled steel sheet, cold-rolling may be performed by applying a cold reduction ratio of 35 to 90% to obtain a cold-rolled steel sheet. When the cold reduction ratio is less than 35%, there may be a problem that recrystallization of the base material and the cladding materials does not occur smoothly, resulting in poor workability. When the cold reduction ratio exceeds 90%, there may be a problem that possibility of occurrence of plate fracture due to rolling load increases. Therefore, the cold reduction ratio may be limited to 35 to 90%.

The cold-rolled steel sheet may be annealed in a temperature within a range of 550° C. or higher and A3+200° C. or lower of the cladding materials. A number of dislocations formed by cold-rolling may be reduced by static recrystallization during annealing, to secure workability of the steel. When an annealing temperature is less than 550° C., sufficient workability cannot be secured. When annealing at a temperature exceeding A3+200° C. of the cladding materials, a surface hardness of the cladding materials may be reduced due to surface decarburization or the like. Therefore, the annealing temperature may be carried out in a temperature within a range of 550° C. or higher and A3+200° C. or lower of the cladding materials.

After the annealing, the method may further include plating the annealed cold-rolled steel sheet by a hot dip plating method to form a plated layer. The plated layer may be one selected from the group consisting of a Zn-based plated layer, a Zn—Fe-based plated layer, a Zn—Al-based plated layer, a Zn—Mg-based plated layer, a Zn—Mg—Al-based plated layer, a Zn—Ni-based plated layer, an Al—Si-based plated layer, and an Al—Si—Mg-based plated layer.

After the annealing, the method may further include cooling the annealed cold-rolled steel sheet to a temperature within a range of martensite transformation end temperature or lower of the cladding materials, and then reheating and tempering a matrix structure of the cladding materials to a temperature within a range of 600° C. or lower.

MODE FOR INVENTION

Hereinafter, the present disclosure will be described more specifically by way of examples. It should be noted, however, that the following examples are intended to illustrate the present disclosure in more detail and not to limit the scope of the present disclosure. The scope of the present disclosure may be determined by the matters described in the claims and the matters reasonably deduced therefrom.

EXAMPLE

A steel ingot of martensitic carbon steel and a steel ingot of lightweight steel sheet having the component composition, shown in Table 1 below, were prepared. After washing surfaces of the steel ingots, the pickled lightweight steel sheet was placed between two of the pickled martensitic carbon steels to prepare a three-ply laminate to have lamination ratios of Table 2 below. Thereafter, arc welding was performed along interfaces of the laminate using a welding rod. The laminate to which the interfaces were welded was reheated in a heating furnace at 1150° C. for 1 hour, and then rolled at a finish-rolling temperature of 900° C. to manufacture a hot-rolled steel sheet. Thereafter, the hot-rolled steel sheet was coiled at 550° C., and then cold-rolled at a cold reduction ratio of 50%, after pickling, to prepare a cold-rolled steel sheet. Then, an annealing temperature thereof was controlled under the conditions shown in Table 2 to perform annealing.

Mechanical properties and plating properties were respectively measured for prepared specimens, and shown in Table 3 below. After performing a tensile test using a universal tensile tester, yield strength (YS), tensile strength (TS), and total elongation (TEL) were measured, and units of yield strength (YS) and tensile strength (TS) were MPa. A unit of total elongation (TEL) was %.

Density was measured by preparing a clad steel sheet in a size of 100×100 mm, measuring weight of the clad steel sheet at room temperature, the clad steel sheet was hung on a wire having a diameter of 0.05 mm, immersing the clad steel sheet in a beaker including water at room temperature, and measuring weight of the clad steel sheet. Density of water as a reference was 1 g/cc.

A surface hardness was measured by measuring a size of an indentation after press-fitting for 10 seconds with a load of 300 gf using a Micro Vickers hardness tester, and at this time, a surface 10 μm was polished and measured to ensure measurement accuracy.

Fatigue limits were measured with a bending fatigue tester for Comparative Example 1, Comparative Example 2, and Inventive Example 1 under the condition of stress ratios-1, and the fatigue limits were results after setting 2,000,000.

TABLE 1

| Steel Type | C | Si | Mn | P | S | Al | B | N | |
|---|---|---|---|---|---|---|---|---|---|
| A1 | 0.18 | 0.03 | 2.6 | 0.004 | 0.0017 | 0.03 | 0.0015 | 0.0048 | |
| A2 | 0.23 | 0.4 | 1.8 | | | 0.03 | 0.002 | 0.0040 | Ni: 0.12, Ti: 0.02 |
| A3 | 0.34 | 0.15 | 1.3 | | | 0.03 | 0.002 | 0.0044 | Cr: 0.14, Mo: 0.12 |
| B1 | 0.79 | 0.099 | 15.1 | 0.011 | 0.0012 | 8.3 | | 0.004 | |
| B2 | 0.810 | 0.65 | 15.2 | 0.011 | 0.001 | 6.2 | | 0.002 | Cr: 0.51, Ni: 0.32 |
| B3 | 0.36 | | 4.8 | 0.0095 | 0.0026 | 5.9 | | 0.006 | |
| B4 | 0.620 | | 4.2 | 0.009 | 0.003 | 7.7 | | 0.004 | Ni: 0.32 |

In Table 1, the unit of each element content is weight %.

TABLE 2

| | Steel Type | | Thickness (mm) | | Thickness Ratio | | Manufacturing Conditions | | |
|---|---|---|---|---|---|---|---|---|---|
| | | | | | | | Hot Reduction Ratio (%) in 1st Pass | Annealing Temp. (° C.) | Cooling Rate (° C./s) |
| | Cladding Material | Base Material | Cladding Material | Base Material | Cladding Material | Base Material | | | |
| CE1 | A1 | | 1.45 | | — | | 15 | 860 | 50 |
| CE2 | B1 | | 1.45 | | — | | 15 | 860 | 50 |
| CE3 | A1 | B1 | 0.03 | 1.37 | 0.02 | 0.98 | 32 | 860 | 50 |

TABLE 2-continued

| | Steel Type | | Thickness (mm) | | Thickness Ratio | | Manufacturing Conditions | | |
| | | | | | | | Hot Reduction | Annealing | Cooling |
| | Cladding Material | Base Material | Cladding Material | Base Material | Cladding Material | Base Material | Ratio (%) in 1st Pass | Temp. (° C.) | Rate (° C./s) |
|---|---|---|---|---|---|---|---|---|---|
| CE4 | A1 | B1 | 0.47 | 0.93 | 0.33 | 0.67 | 32 | 860 | 50 |
| CE5 | A1 | B1 | 0.35 | 1.05 | 0.25 | 0.75 | 32 | 770 | 80 |
| IE1 | A1 | B1 | 0.35 | 1.05 | 0.25 | 0.75 | 32 | 860 | 50 |
| IE2 | A1 | B1 | 0.20 | 1.20 | 0.14 | 0.86 | 32 | 860 | 50 |
| IE3 | A2 | B1 | 0.20 | 1.20 | 0.14 | 0.86 | 32 | 850 | 50 |
| IE4 | A3 | B1 | 0.20 | 1.20 | 0.14 | 0.86 | 32 | 830 | 50 |
| IE5 | A1 | B2 | 0.20 | 1.20 | 0.14 | 0.86 | 32 | 860 | 50 |
| IE6 | A1 | B3 | 0.28 | 1.12 | 0.20 | 0.80 | 32 | 860 | 50 |
| IE7 | A1 | B4 | 0.28 | 1.12 | 0.20 | 0.80 | 32 | 860 | 50 |

*IE: Inventive Example, **CE: Comparative Example

TABLE 3

| | Plate Separation | Properties | | | | Surface Hardness (Hv) | Fatigue Limit (MPa) |
| | | YS | TS | El | Density | | |
|---|---|---|---|---|---|---|---|
| CE1 | — | 1115 | 1518 | 7 | 7.84 | 449 | 610 |
| CE2 | — | 654 | 1042 | 52 | 7.24 | 267 | 430 |
| CE3 | X | 665 | 1054 | 50 | 7.25 | 376 | |
| CE4 | X | 808 | 1201 | 33 | 7.44 | 442 | |
| CE5 | O | | | | | | |
| IE1 | X | 769 | 1161 | 37 | 7.39 | 448 | 580 |
| IE2 | X | 720 | 1110 | 43 | 7.33 | 444 | |
| IE3 | X | 732 | 1124 | 43 | 7.33 | 472 | |
| IE4 | X | 744 | 1172 | 42 | 7.33 | 498 | |
| IE5 | X | 794 | 1115 | 36 | 7.37 | 447 | |
| IE6 | X | 732 | 987 | 25 | 7.38 | 452 | |
| IE7 | X | 741 | 1008 | 28 | 7.29 | 449 | |

*IE: Inventive Example, **CE: Comparative Example

As can be seen from Tables 1 to 3, in Inventive Examples 1 to Inventive Examples 7 satisfying all the compositions of the present disclosure, it was confirmed that the elongation of 25% or more, the density of 7.4 g/cm³ or less, and the surface hardness of 400 Hv or more were secured. In Comparative Example 1, martensitic carbon steel without a cladding material, surface hardness was high and fatigue properties was good, but an elongation of 25% or more was not secured.

In Comparative Example 2, a lightweight steel sheet without a cladding material, elongation and density were satisfied, but surface hardness was low and fatigue properties were deteriorated.

In Comparative Example 3, a thickness of one (1) cladding material among the cladding materials was about 15 µm, and surface hardness was not secured.

In Comparative Example 4, a thickness ratio of the cladding material was 30% or more, and formability and surface hardness were satisfied, but the density of 7.4 g/cm³ or less was not secured.

In Comparative Example 5, since a reduction ratio in a first pass was less than 30%, and plate separation occurred, the clad steel sheet was not manufactured.

FIG. 2 is an optical microscope photograph showing a microstructure of a boundary between the base material and the cladding material of Inventive Example 1. FIG. 3 is a scanning electron micrograph showing a state of element distribution at a boundary between the base material and the cladding material of Inventive Example 1. The lightweight steel sheet, a base material, may be composed of an austenite single phase, and each of the cladding materials may be composed of martensite structure. No specific structure including oxide was observed between the base material and the cladding materials, and this observation may be confirmed from the element distribution of FIG. 3.

Figure 4:
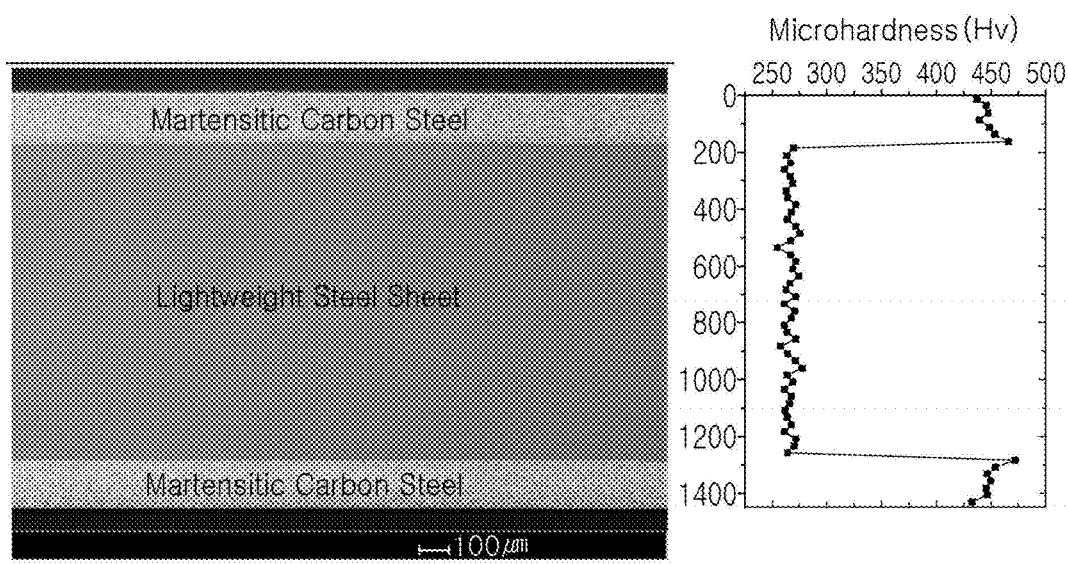
FIG. 4 shows a scanning electron micrograph capturing a total thickness of Inventive Example 1, and a graph showing microhardness distribution measured at each thickness position.

FIG. 4 shows a scanning electron micrograph capturing a total thickness of Inventive Example 1, and a graph showing microhardness distribution measured at each thickness position. Hardness of each of the cladding materials composed of martensite structure was 450 Hv, and the base material composed of the lightweight steel sheet was 260 Hv.

Figure 5:
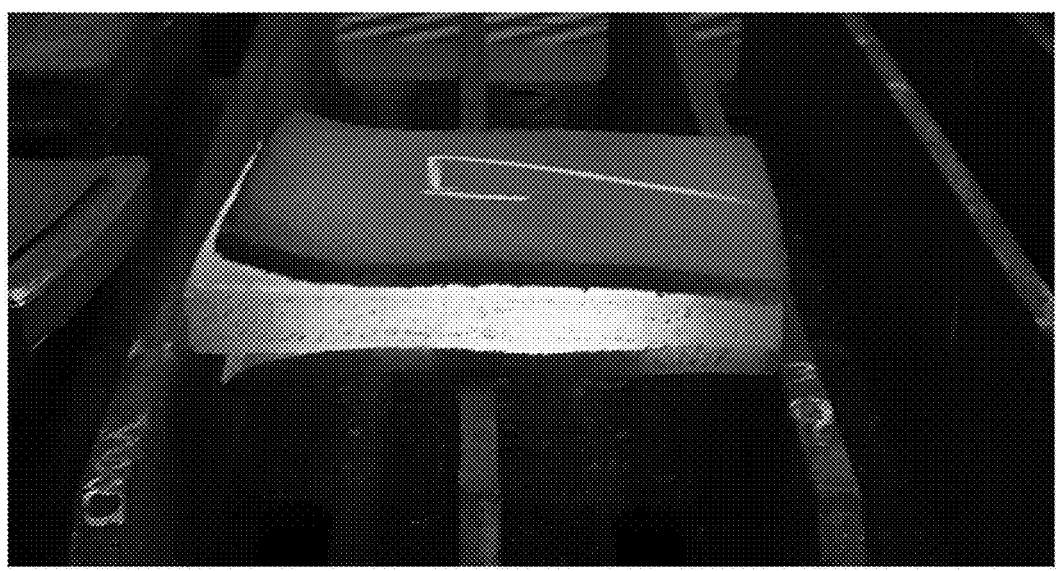
FIG. 5 is a photograph showing an appearance of Comparative Example 5 after hot-rolling.

FIG. 5 is a photograph showing an appearance of Comparative Example 5 after hot-rolling. Plate separation proceeded immediately after one pass, and subsequent rolling was not performed.

Figure 6:
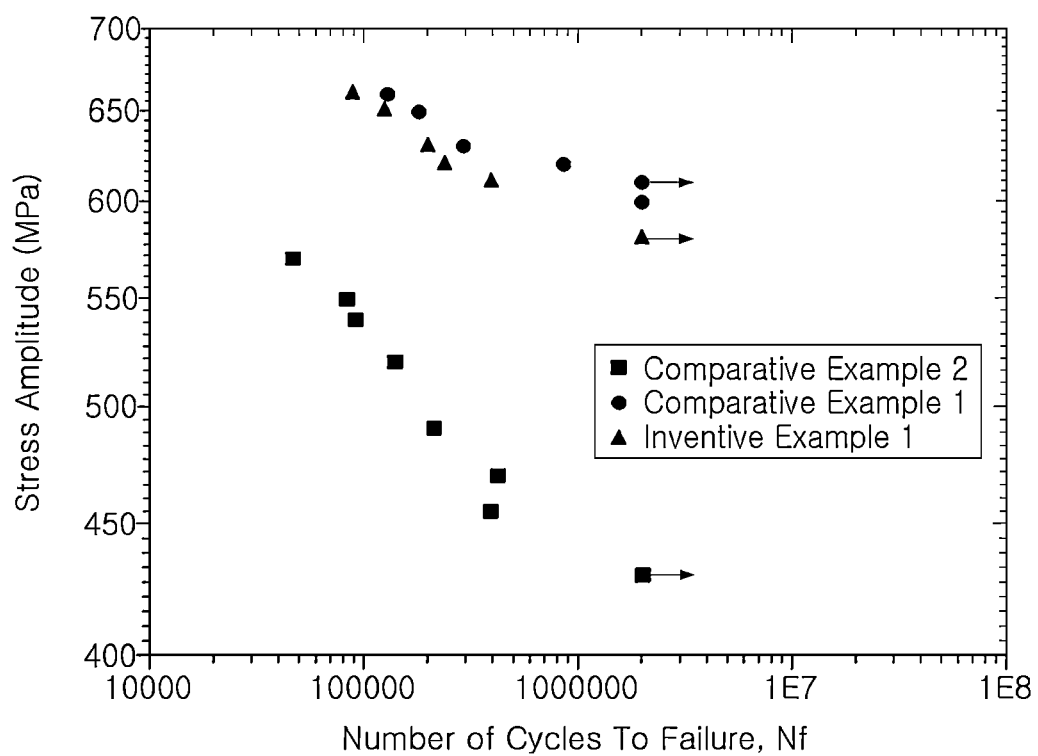
FIG. 6 is a graph illustrating fatigue test results of Comparative Example 1, Comparative Example 2, and Inventive Example 1.

FIG. 6 is a graph illustrating fatigue test results of Comparative Example 1, Comparative Example 2, and Inventive Example 1. Comparative Example 1 and Inventive Example 2, having high surface hardness, showed a fatigue limit of 500 MPa or more. This may be because fatigue crack propagation starts at surfaces, and durability performance may be improved when surface hardness is high. For example, it can be seen that a fatigue life of a steel material may be proportional to hardness of a surface material.

While example embodiments have been shown and described above, it will be apparent to those skilled in the art that modifications and variations could be made without departing from the scope of the present disclosure as defined by the appended claims.

What is claimed is:

1. A method of manufacturing a clad steel sheet having excellent formability and fatigue properties, the method comprising:
   preparing a base material including, by weight, C: 0.3 to 1.0%, Mn: 4.0 to 16.0%, Al: 4.5 to 9.0%, and a remainder of Fe and inevitable impurities;
   preparing a cladding material including, by weight, C: 0.1 to 0.45%, Mn: 0.1 to 3.0%, and a remainder of Fe and inevitable impurities;
   disposing the base material between two of the cladding material to obtain a laminate;
   welding an edge of the laminate to obtain a welded laminate;
   heating the welded laminate to a temperature within a range of 1050 to 1350° C. to obtain a heated laminate;
   hot-rolling the heated laminate with a rolling reduction ratio of 30% or more in a first pass to obtain a hot-rolled steel sheet, wherein a finish-rolling temperature of the hot-rolling is within a range of 750 to 1050° C.;

coiling the hot-rolled steel sheet at a temperature within a range of 400 to 700° C. to obtain a coiled hot-rolled steel sheet;

pickling the coiled hot-rolled steel sheet, and applying a cold-reduction ratio of 35 to 90% thereto to obtain a cold-rolled steel sheet; and annealing the cold-rolled steel sheet at a temperature in a range of 550° C. or higher and A3+200° C. or lower of the cladding material to obtain an annealed cold-rolled steel sheet.

2. The method of claim 1, further comprising: cooling the annealed cold-rolled steel sheet to a temperature within a range of martensite transformation end temperature (Mf) or lower of the cladding material, and then reheating and tempering to a temperature within a range of 600° C. or lower.

* * * * *